March 30, 1943. E. ALAVA Y SAUTU 2,314,965
APPARATUS FOR SIGNALIZING THE DECREASE OF PRESSURE OF PNEUMATIC TIRES
Filed Aug. 9, 1939 4 Sheets-Sheet 1
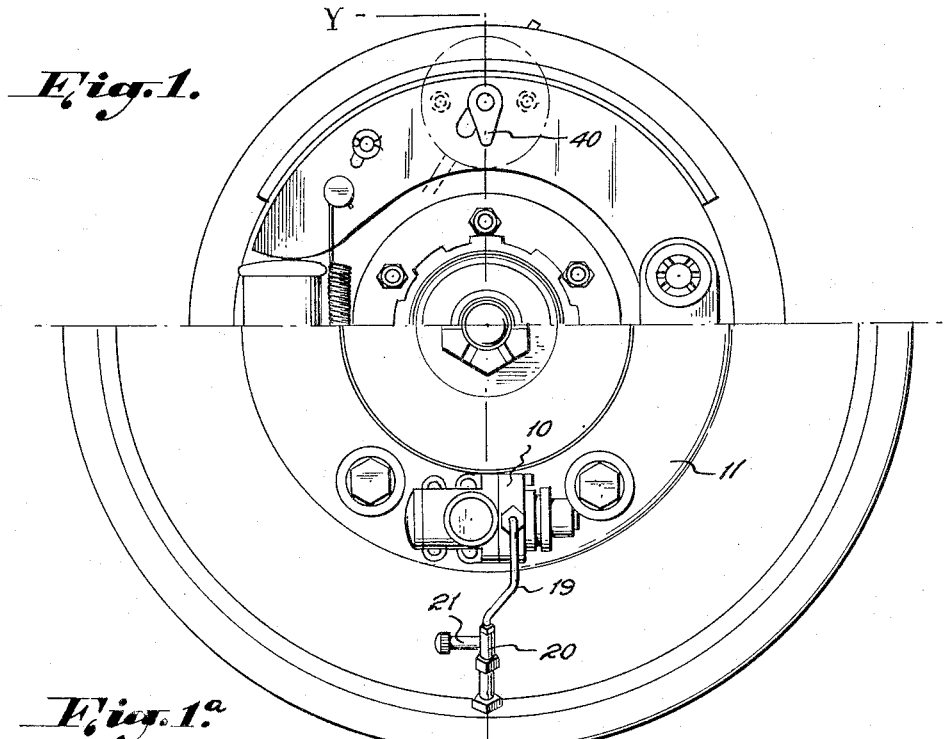
Fig. 1.
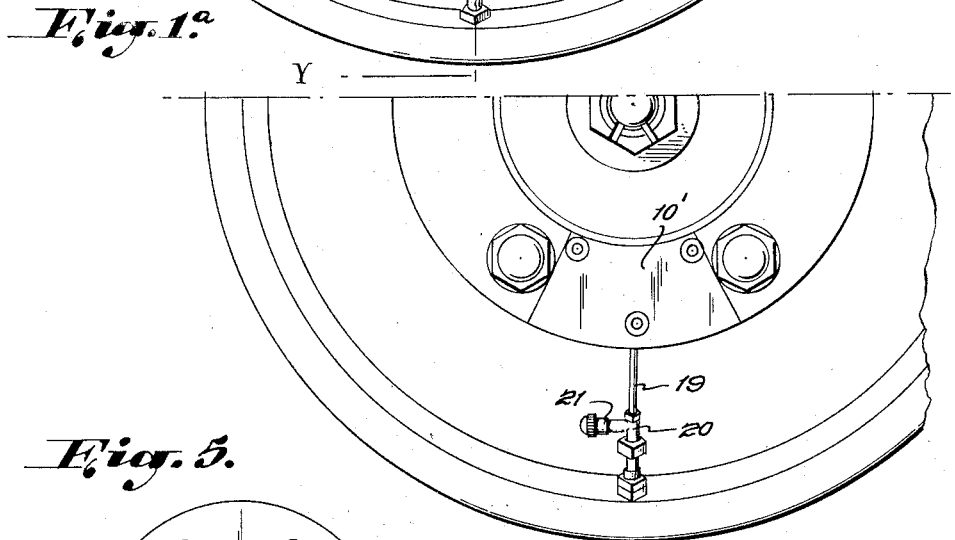
Fig. 1ª.
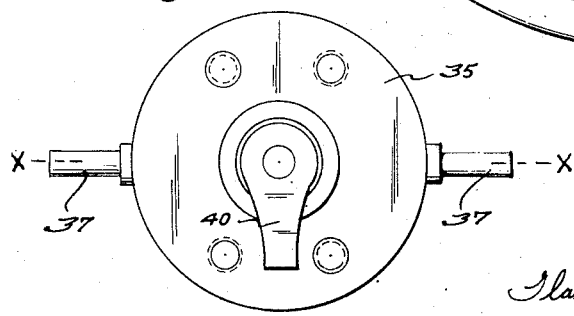
Fig. 5.
INVENTOR
Emilio Alava Y. Sautu
BY Glascock Downing & Seeboll
ATTORNEYS March 30, 1943. E. ALAVA Y SAUTU 2,314,965
APPARATUS FOR SIGNALIZING THE DECREASE OF PRESSURE OF PNEUMATIC TIRES
Filed Aug. 9, 1939 4 Sheets-Sheet 2
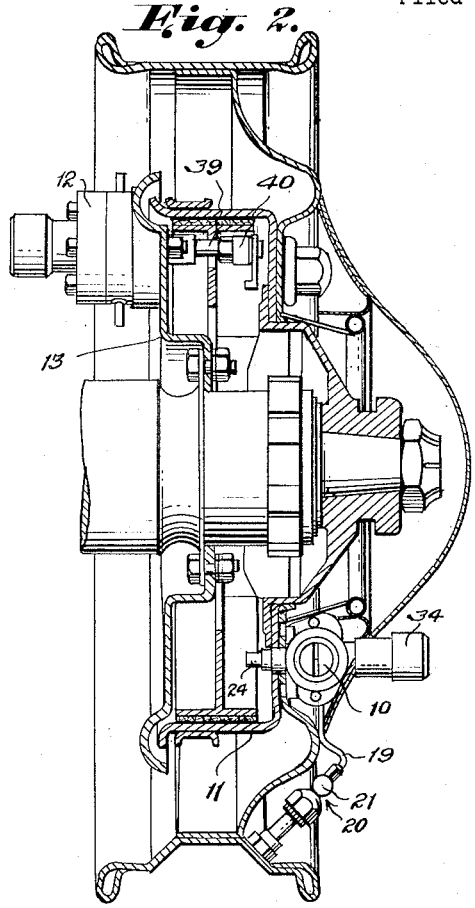
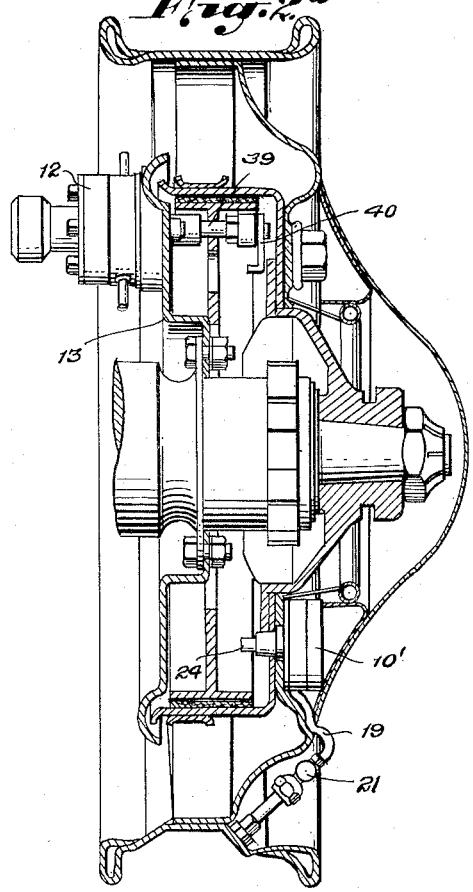
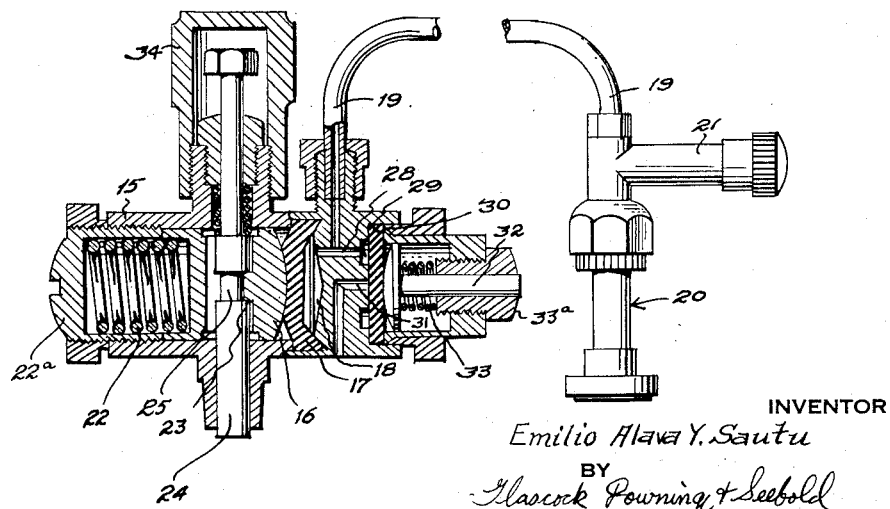
INVENTOR
Emilio Alava Y. Sautu
BY
Glascock Powning & Seebold
ATTORNEYS

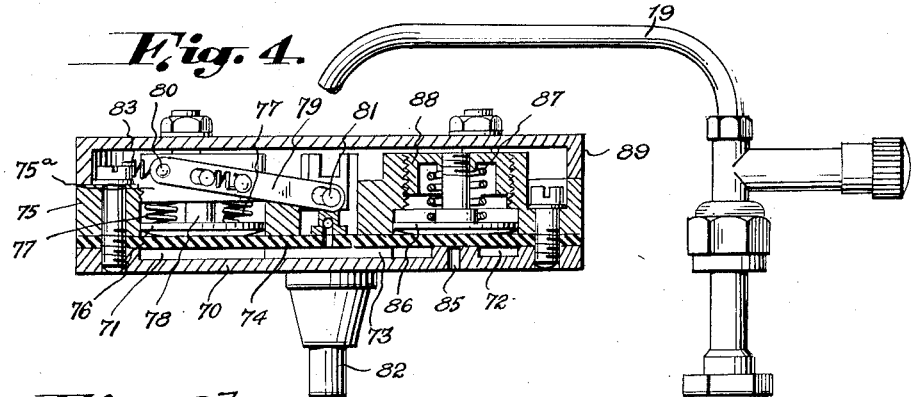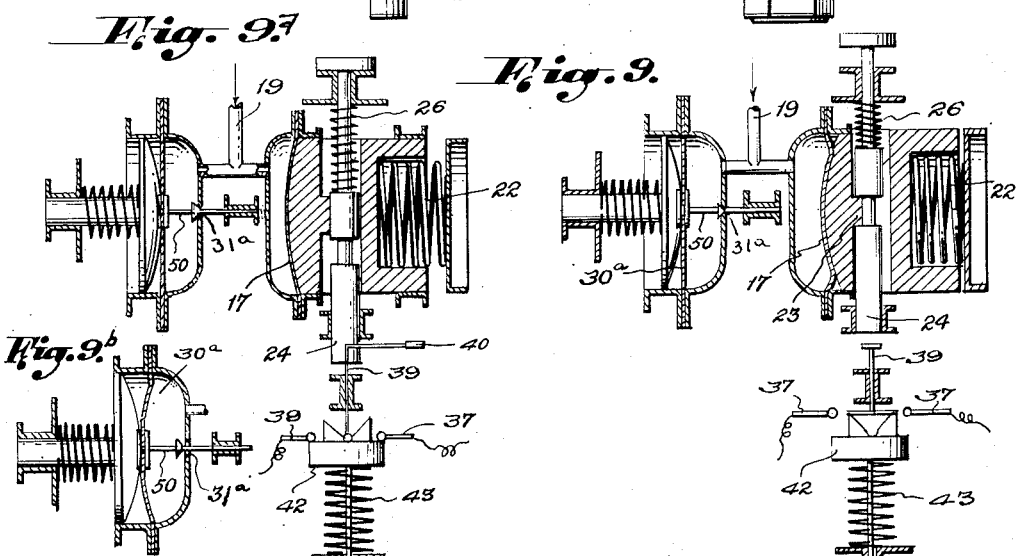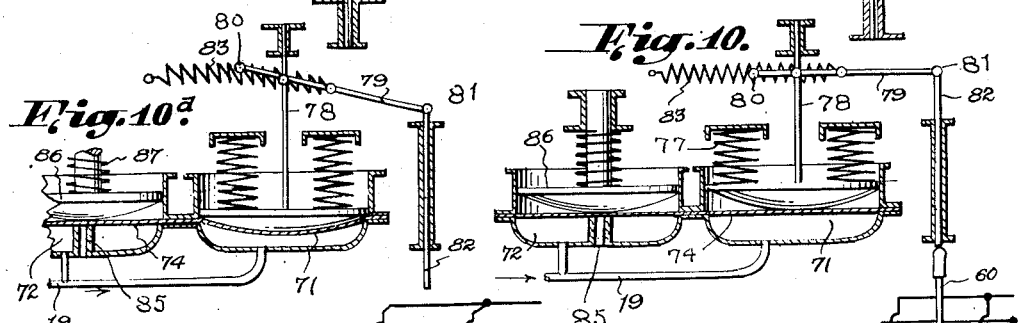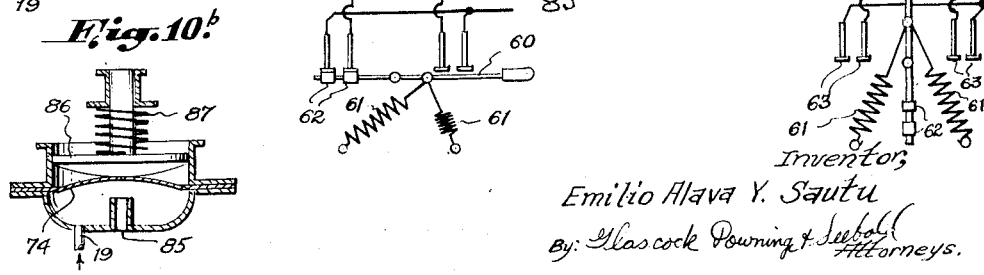

March 30, 1943. E. ALAVA Y SAUTU 2,314,965
APPARATUS FOR SIGNALIZING THE DECREASE OF PRESSURE OF PNEUMATIC TIRES
Filed Aug. 9, 1939 4 Sheets-Sheet 4
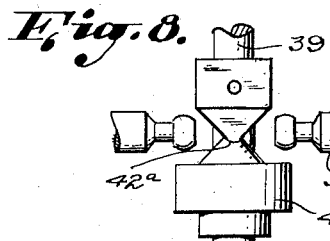
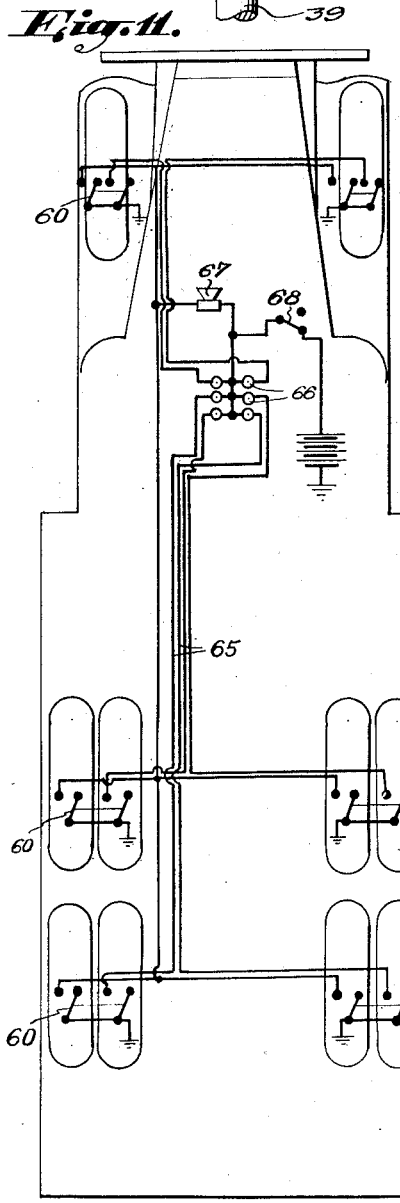
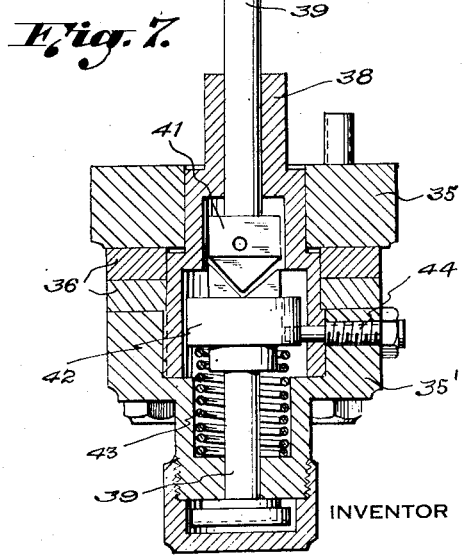
INVENTOR
BY *Emilio Alava Y Sautu*
Glascock Downing & Seebold
ATTORNEYS Patented Mar. 30, 1943

2,314,965

UNITED STATES PATENT OFFICE 2,314,965

APPARATUS FOR SIGNALIZING THE DECREASE OF PRESSURE OF PNEUMATIC TIRES

Emilio Alava y Sautu, Vitoria, Spain

Application August 9, 1939, Serial No. 289,324
In Spain August 17, 1938

5 Claims. (Cl. 200—58)

It is well known that it is of the greatest importance that the pneumatic tires of automobile vehicles should always remain inflated at the most suitable and correct pressure, according to their dimensions and the load they have to support, as when they are used under conditions of insufficient pressure or excessive pressure, there is produced a rapid wearing out of same.

This condition is especially important in automobile trucks fitted with double or twin wheels, and in which the accidental decrease of pressure in one of the twin tires, causes, as a result, an overload on the other pneumatic tire.

The invention avoids this trouble, correcting the excess of pressure of the pneumatic and provides the means by which the driver of the vehicle is advised of any decrease of the pressure of a determined grade that may take place in one of the tires of the vehicle, during all the time these conditions prevail, with the object that he may take the necessary measure immediately for putting the tires again in their proper working order.

The present patent has for object, an apparatus, applicable to automobile vehicles or similar vehicles, that, in addition to avoiding an excess of pressure, advises by means of acoustic or luminous signals when the pressure of any one of the pneumatic tires descends below a previously determined point, these signals acting all the time the tire is in the condition of a low pressure.

The working and characteristics of the apparatus, will be better understood, from the description that follows with relation to the attached drawings, in which there are represented, as examples, some forms of this invention.

Figure 1 shows a view of a wheel, partly complete and partly with the disc, the wheel mass and the brake drum withdrawn, showing the relative position of the release and contact mechanisms.

Figure 1a shows a part of a wheel with a variation in the construction of the release mechanism.

Figure 2 shows a vertical section, through the line Y—Y of Figure 1.

Figure 2a shows a wheel in vertical section, with the apparatus according to the variation of Figure 1a.

Figure 3 is a section of the construction of the release mechanism according to the construction of Fig. 1.

Figure 4 is a section of the release mechanism, according to the construction of Fig. 1a.

Figure 5 shows the head of the pin of the contact mechanism, with its arm which is driven by the stem of the release mechanism.

Figure 6 is a section of the contact mechanism, according to the line X—X of Fig. 5.

Figure 7 is a section of the contact mechanism, taken at right angles to Fig. 6.

Figure 8 is a detail of the arrangement of the contacts of the mechanism referred to.

Figures 9, 9a and 9b show in a schematic form the construction shown in Figures 1, 2 and 3, in different working positions.

Figures 10, 10a and 10b show in a schematic form the construction corresponding to the apparatus of Figures 1a, 2a and 4.

Figure 11 is a diagram of the complete installation in an automobile vehicle.

As can be seen in Figures 1 and 2 the release mechanism 10 is mounted on the wheel, at a point of the plate of same which rests on the brake drum 11 while the contact mechanism 12 is mounted on a corresponding point of the guard plate 13 and at a suitable distance from the axle of the wheel. In dealing with dismountable wheels, the release mechanism may be mounted on the same wheel at a point corresponding to an aperture made in the brake drum and dealing with artillery wheels or with dismountable rims, it may be then mounted directly on the brake drum.

The release mechanism 10 is constituted by a cylindrical body 15 (Fig. 3) in the interior of which there may move a piston 16 which rests against the flexible membrane 17. This membrane 17 encloses a chamber 18 formed in an end of the body of the mechanism and which is in communication by means of the tube 19 with the interior of the tube of the pneumatic tire. This communication may be established advantageously by means of a T piece 20 placed on the usual stem of the tire after having withdrawn the tire valve, thus leaving a free passage to the air in both directions, while in the free branch 21 there is arranged the valve in order to allow of the normal filling of the tire.

The piston 16 is constantly pressed against the membrane 17 by means of the spring 22 the force of which may be varied in accordance with each case. This piston is perforated transversally, by a relatively large orifice, which has a projection 23 in the part close to the head of the piston. Through the interior of this orifice there passes a stem 24 the ends of which properly guided by prolongations of the body of the apparatus, can slide axially with a smooth friction. The stem 24 has a throat or narrower part 25 and is subjected to the action of a spring 26. The projection 23 of the interior of the head of the piston, is introduced in the throat 23 of the stem, keeping same in the position of Fig. 3 when the piston 16 is pushed by the pressure of the membrane 17 overcoming the tension of the spring 22. When the pressure of the pneumatic tire decreases and consequently that of the chamber 18, the membrane 17 yields to the pressure of the spring 22 and the moving piston 16 releases the stem 24 which in its turn is displaced axially, projecting from the apparatus.

This release mechanism, may also be combined with a maximum pressure valve, in order to avoid an excessive pressure of the tire, thus obtaining that the said pressure shall be constantly maintained between the limits of safety. To this end, the tube 19 is also in communication, through the branch 28 with ring shaped chamber 29 covered with a flexible membrane 30. In the center of this ring shaped chamber, there has been made an orifice 31 which communicates with the atmosphere and is normally closed by the same flexible membrane 30. This membrane, is held in the position shown, by means of a stem 32 which rests against it, being pressed against same by a spring 33 the strength of which is variable, in each case. In order to duly adjust the pressure of the springs 22 and 33 there may be arranged adjustable screws 22a and 33a. At the same time, the head of the journal 24 is protected against dust, by a cover 34.

Once the apparatus has acted and on again reestablishing the proper pressure in the pneumatic tire, it is only necessary to draw out the head of the stem 24 in order to return it to its locked position with respect to the piston.

However, it may be arranged that the stem withdraws automatically on the pneumatic tire being filled again with air. An example of this, is shown in Figs. 1a, 2a, and 4, which shows the arrangement of the chambers one at the side of the other and giving an apparatus of a flattened form. The release mechanism, shown in these figures includes a base plate 70 with two circular reduced portions 71 and 72 which constitute the chambers of both valves, which communicate between each other by means of a groove 73. This trough 73 leads to the tube 19 already described in the former case which puts the apparatus in communication with the inflating valve of the pneumatic tire. On the base plate 70 there is arranged a flexible membrane 74 which covers the two chambers 71 and 72 and is duly held by the top piece 75. In the first of these chambers, there has been arranged the piston 76 applied against the membrane 74 by means of the springs 77 in such a way that they equalize the normal pressure present in the interior of the said chamber 71. The springs 77 are confined between the piston 76 and suitable abutment members 75a provided on the top piece 75. The piston 76 is provided with a pin 78 the top end of which is coupled to the lever 79 which revolves around the axle 80 so that the lever follows the movements of ascent and descent of the piston. The free end of the lever is coupled at 81 to the top end of the movable stem 82 so that this stem also follows the movements of the piston 76 and when the tire pressure is reduced it moves and the stem 82 projects into position to move the contact mechanism. When the pressure is reestablished, the piston rises and the stem automatically again occupies its normal position. The spring 83 arranged in combination with the lever, keeps this in the two limit positions of its displacement, in order to avoid oscillations that might cause a premature release.

The maximum pressure valve is of a construction similar to the previous one. The centre of the cavity 72 is raised and formed with a discharge orifice 85 which remains closed by the membrane itself, on top of which there is applied the piston 86 by means of a spring 87 the pressure of which may be graduated by the threaded nut 88. The whole of both valves is covered with a protecting cover 89.

The contact mechanism, in one of the more suitable forms, may be formed as is shown in Figures 5 to 8. It includes a body formed by two pieces 35 and 35' between which there has been arranged the plates of insulating material 36 which hold and maintain properly the two terminals or opposite contact posts 37. The pieces forming the body are joined together, by suitable screws and hold a sleeve 38 which extends from the body, forming a guide for the pin 39 which extends longitudinally. The pin 39 on its free end carries an arm 40 which projects laterally and is adjustably mounted, so that its position may be varied both as regards height and angularity.

The piece 35' forms an interior cavity and the opposite end of the pin 39 is also guided in the bottom of the said cavity.

Once the apparatus is properly mounted, this arm 40 is situated in the path of the prolongation of the stem 24 (Fig. 3) or 82 (Fig. 4) of the release mechanisms, so that when this stem is projected, it meets with the arm 40 and makes the pin 39 revolve.

The pin 39 carries fixed at a suitable point, a wedge shaped cam piece 41 and also passes through another piece 42 that may move axially on the pin 39 and is under the action of the spring 43. The piece 42 is of annular form and is guided by the screw 44 in order that it cannot turn on the pin. The front part of this piece is formed with a recess having a shape corresponding to that of the cam piece 41. Thus if this piece 41 is made to turn through an angle of 90° with relation to the position of the piece 42, this latter is displaced downwards, remaining locked in the position shown in Figure 8, owing to engagement of the cam piece 41 with shallow notches 42a in the piece 42.

Under these conditions, if the arm 40 receives a slight blow, it will turn the pin 39 disengaging the cam piece 41 from the notches 42a and the piece 42 will be free to move under the pressure of the spring 43 until its circular rim will come in contact with the two connectors 37 establishing one or more circuits, corresponding to the luminous or acoustical signals which notify the driver of the state of the respective pneumatic tire. The turning of the pin 39 is approximately of a magnitude of 90° beginning from its resting position and consequently, the arm 40 cannot be again engaged by the stem 24.

In order to better understand the working of the apparatus described, there is shown in a schematic way, in Figures 9 and 9a respectively, the different organs of the apparatus, in the position of rest, while the pressure is maintained between the fixed limits, and in the position after the device has operated and established the contact. These figures refer to the first type of the invention described and like parts are designated by the same reference characters with the exception that the maximum pressure valve 30 is replaced by a needle valve 50 joined to the central part of the membrane 30a and controlling atmospheric part 31a. Figure 9b, shows the position of the said valve on opening.

The construction described with relation to the Figures 1a, 2a, and 4, is shown schematically in Figures 10, 10a and 10b, in which there is shown as a variation, another form of the electrical contact, which includes a lever 60 connected with two springs 61 one at each side, which maintain it in a position of equilibrium; this lever, on one of its ends has two contact blocks 62 and also there have been arranged two terminals 63 so that on the lever receiving a blow from the stem 82 and being rocked in one sense or other by the springs 61, it closes the circuit through one of the two pairs of terminals.

The general installation of a vehicle is shown also schematically, in Fig. 11. For twin wheels, it is sufficient to have only one contact apparatus, that can be worked by the release mechanisms of the two wheels; this will afford the driver an indication of the situation of the wheel that is out of order, and upon examination of the state of the wheels, he can see which of the two apparatus has released owing to the decrease of tire pressure. The contacts of the wheels act through the series of conductors 65 in the circuit of the lamps 66 and of the acoustic signal 67 and as a means of security against any possible carelessness on the part of the driver, these signals receive current by means of the switch 68 of the motor ignition circuit of the vehicle (which circuit is not shown), so that on the switch acting to break the current of the signals, the motor of the vehicle stops and vice versa.

The apparatus which has just been described, provides an easy and secure means of warning when pneumatic tires are at an incorrect pressure and especially the lack of pressure in the same.

I claim:

1. Apparatus for signalling the reduction of the pressure of pneumatic tires, comprising in combination, a device controlled by the pressure of the tire, said device including a sliding stem slidable longitudinally when the pressure in the tire falls; and a maximum pressure valve, including a chamber in communication with the interior of the tire and having an aperture communicating with the exterior, means for closing the said chamber and the said aperture and for opening the said aperture when the pressure in the interior of the tire exceeds a determined limit.

2. Apparatus for signalling the reduction of pressure of pneumatic tires comprising in combination, a device controlled by the pressure of the pneumatic tire, including a chamber communicating constantly with the pneumatic tire and at the same pressure as the tire, a flexible membrane closing said chamber, a piston resting on the said membrane, a spring acting on said piston, and a sliding stem coupled to the said piston, whereby the stem slides longitudinally when the pressure in the interior of the tire decreases; a maximum pressure valve including a ring shaped chamber in constant communication with the tire, a tube in the center of said ring chamber in communication with the outside, a flexible membrane closing at the same time the chamber and the mouth of this tube, and a spring of graduable tension acting on said flexible membrane, whereby when the pressure in the interior of the tire exceeds a certain limit regulated by the tension of the spring, the flexible membrane relaxes and leaves uncovered the mouth of the tube that communicates with the exterior, allowing of the escape of the air until the pressure of the tire attains the desired value.

3. An apparatus as claimed in claim 2, characterized by the provision of a tooth on said piston engageable in a recess in said stem to retain the latter in a predetermined position, and spring means normally tending to displace said stem.

4. An apparatus as claimed in claim 1, characterized in that the pressure controlled device also includes a chamber in communication with the pneumatic tire, a flexible diaphragm covering said chamber, a spring pressed piston engaging said diaphragm, and provided with a pin, a lever pivoted at one end to a fixed point and at its other end to said sliding stem, the medial portion of said lever engaging said pin and spring means for retaining said lever in its alternative positions.

5. An apparatus as claimed in claim 1, characterized in that the pressure controlled device also includes a chamber in communication with the pneumatic tire, a flexible diaphragm covering said chamber, a spring pressed piston engaging said diaphragm, and provided with a pin, a lever pivoted at one end to a fixed point and at its other end to said sliding stem, the medial portion of said lever engaging said pin and spring means for retaining said lever in its alternative positions, said chamber having an orifice communicating with the atmosphere and normally covered by said diaphragm, and pressure responsive means acting on said diaphragm to maintain the latter in closed position with respect to said orifice.

EMILIO ALAVA Y SAUTU.